United States Patent [19]
DeAngelis

[11] Patent Number: 6,120,053
[45] Date of Patent: Sep. 19, 2000

[54] COLLAPSIBLE PUSHCART FOR SUPPORTING A GOLF CLUB BAG

[76] Inventor: Dennis E. DeAngelis, 4815 Kieran Ct., Santa Rosa, Calif. 95405

[21] Appl. No.: 09/275,668

[22] Filed: Mar. 24, 1999

Related U.S. Application Data

[63] Continuation-in-part of application No. 08/767,415, Dec. 16, 1996, abandoned.

[51] Int. Cl.[7] ....................................................... B62B 3/02
[52] U.S. Cl. .................... 280/641; 280/651; 280/DIG. 6; 280/47.35
[58] Field of Search .............................. 280/639, 37, 641, 280/642, 42, 646, DIG. 6, 47.34, 47.35, 62, 651

[56] References Cited

U.S. PATENT DOCUMENTS

| | | |
|---|---|---|
| 3,926,448 | 12/1975 | Reichard . |
| 4,176,752 | 12/1979 | Taber . |
| 4,784,401 | 11/1988 | Raguet . |
| 5,647,601 | 7/1997 | Potter et al. .......................... 280/47.38 |
| 5,743,552 | 4/1998 | Baechler et al. ........................ 280/642 |
| 5,765,855 | 6/1998 | Chiu ........................................ 280/642 |
| 6,017,051 | 1/2000 | Thimmig ................................. 280/642 |
| 6,036,220 | 3/2000 | Zhen ....................................... 280/642 |

FOREIGN PATENT DOCUMENTS

| | | |
|---|---|---|
| 483754 | 4/1938 | United Kingdom . |
| 642638 | 9/1950 | United Kingdom . |
| 649222 | 1/1951 | United Kingdom ............. 280/DIG. 6 |

*Primary Examiner*—Paul N. Dickson
*Assistant Examiner*—Avraham H. Lerner
*Attorney, Agent, or Firm*—Malcolm B. Wittenberg

[57] ABSTRACT

A collapsible pushcart is provided having a collapsible frame that includes a base frame assembly, an upper frame assembly pivotally connected to the base frame assembly, and a front assembly pivotally connected to the base and upper frame assemblies. The upper frame assembly has an adjustable securing mechanism for securing upper portions of golf club bags of varying lengths to the upper frames assembly. The front frame assembly has a securing mechanism for securing a lower portion of a golf bag to the front frame assembly. Rear wheels are detachably connected to the base frame assembly and a front wheel is detachably attached to the front frame assembly. A release mechanism maintains the collapsible pushcart in a deployed position when the release mechanism is in a closed position. If the release mechanism is moved to an opened position, the collapsible pushcart transitions to a collapsed position via the pivot connections in response to a user moving the front frame assembly.

8 Claims, 5 Drawing Sheets

COLLAPSIBLE PUSHCART FOR SUPPORTING A GOLF CLUB BAG

This application is a C-I-P of Ser. No. 08/767,415 filed Dec. 16, 1996, abandoned.

FIELD OF THE INVENTION

The present invention relates to the field of golf bag carriers, and more particularly to a collapsible pushcart for supporting a golf club bag.

BACKGROUND OF THE INVENTION

Some conventional golf bag carriers or carts have two wheels, a mounting region, and a handle for permitting a user to pull the golf bag carrier. These two-wheel golf bag carriers suffer from a number of drawbacks. First, they are inherently unstable and can be easily knocked over when they are in a stationary position. Second, the pulling motion required to move these golf bag carriers is awkward and often causes discomfort. As can readily be appreciated, this discomfort can effect a player's golf game.

Although other golf bag carriers have three wheels that increase their stability, they still require a user to pull them and, thus, do not alleviate the awkwardness and/or discomfort of the pulling motion. In addition, the conventional three-wheel golf bag carriers do not collapse or fold into a compact form that facilitates their storage.

The present invention is directed to overcome one or more of the drawbacks discussed above, as well as drawbacks not listed for the sake of brevity.

SUMMARY OF THE INVENTION

Briefly stated, a collapsible pushcart is provided having a collapsible frame that includes a base frame assembly, an upper frame assembly pivotally connected to the base frame assembly, and a front assembly pivotally connected to the base and upper frame assemblies. The upper frame assembly has an adjustable securing mechanism for securing upper portions of golf club bags of varying lengths to the upper frames assembly. The front frame assembly has a securing mechanism for securing a lower portion of a golf bag to the front frame assembly. Rear wheels are detachably connected to the base frame assembly and a front wheel is detachably attached to the front frame assembly. A release mechanism maintains the collapsible pushcart in a deployed position when the release mechanism is in a closed position. If the release mechanism is moved to an opened position, the collapsible pushcart transitions to a collapsed position via the pivot connections in response to a user moving the front frame assembly.

One advantageous embodiment includes a collapsible pushcart for supporting a golf bag, the collapsible pushcart having a collapsible frame having a collapsed position and a deployed position, a release mechanism attached to the collapsible frame, the release mechanism permitting the collapsible frame to transition from the deployed position to the collapsed position, a plurality of wheels attached to a lower portion of the collapsible frame for supporting the collapsible frame, at least one support structure on an upper portion of the collapsible frame for supporting the golf bag on the collapsible frame, and a counterweight connected to the collapsible frame such that the counterweight stabilizes the frame when the frame is in the deployed position and facilitates the transition of the frame from the deployed position to the collapsed position.

Another advantageous embodiment includes a collapsible pushcart for supporting a golf club bag having a base frame assembly having a pair of rear wheels rotatably connected thereto, an upper frame assembly pivotally connected to the base frame assembly, the upper frame assembly having an adjustable support bar slidably attached thereto such that a user can position the adjustable support bar to support an upper portion of a golf club bag thereon, and a first securing mechanism attached to the adjustable support bar for securing the upper portion of the golf club bag to the adjustable support bar, a front frame assembly pivotally connected to the base frame assembly and the upper frame assembly, the front frame assembly having a front wheel rotatably connected thereto, a support platform attached thereto for supporting a lower portion of the golf club bag, and a second securing mechanism attached thereto for securing the lower portion of the golf club bag to the support platform, and a release mechanism interconnecting the upper frame assembly and the front frame assembly such that the collapsible pushcart is maintained in a deployed position when the release mechanism is engaged and transitions to a collapsed position when the release mechanism is disengaged, the front frame assembly extending to a position external of the base frame assembly and the upper frame assembly extending a position above the base frame assembly when the collapsible pushcart is in the deployed position, the front frame assembly pivoting to a position internal to the base frame assembly and the upper frame assembly pivoting to a position adjacent the base frame assembly when the pushcart is in the collapsed position.

BRIEF DESCRIPTION OF THE DRAWINGS

The aforementioned advantages of the present invention as well as additional advantages thereof will be more clearly understood hereinafter as a result of a detailed description of a preferred embodiment of the invention when taken in conjunction with the following drawings in which.

DETAILED DESCRIPTION OF THE DRAWINGS

Figure 1:
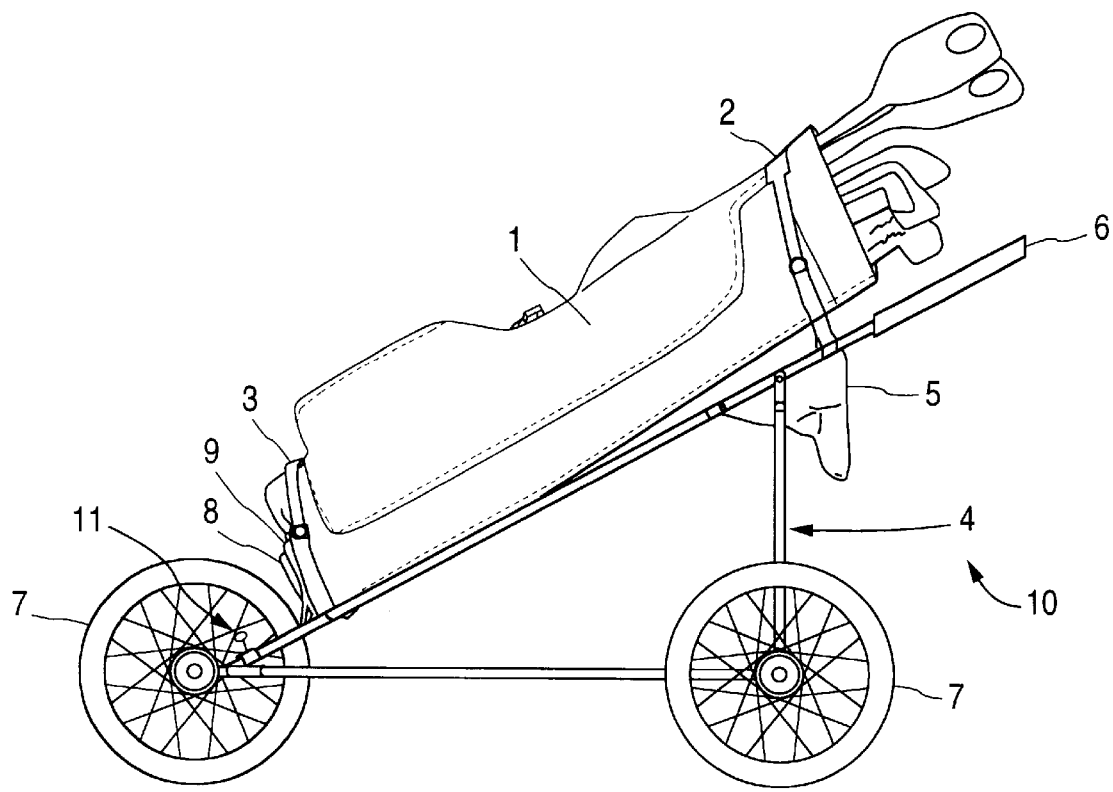
FIG. 1 is a side elevational view of the collapsible push cart of the present invention in the deployed position.

Referring now to FIG. 1, a collapsible pushcart 10 of the present invention is shown in the deployed position supporting a golf bag 1. The collapsible pushcart 10 includes a collapsible frame 4 that is preferably fabricated from lightweight aluminum tubing. The collapsible frame 4 is supported by wheels 7 (two of three shown) that preferably have metal rims, spokes, and inflatable rubber tires. The golf bag 1 is securely supported on the collapsible pushcart 10 by a bag stand platform 9, an upper golf bag support structure 2, and a lower golf bag support structure 3. A counterweight 8 is attached to the underside of the bag stand platform 9 to increase the stability of the collapsible pushcart 10 and to facilitate the collapsing of the collapsible pushcart 10. The counterweight 8 is preferably fabricated from lead. A nylon pocket S may be snapped to an upper portion of the collapsible frame 4 adjacent a padded handle 6. A pair of quick release mechanisms 11 (one of two shown) are located at a lower portion of the collapsible frame 4 adjacent the front wheel 7.

Figure 2:
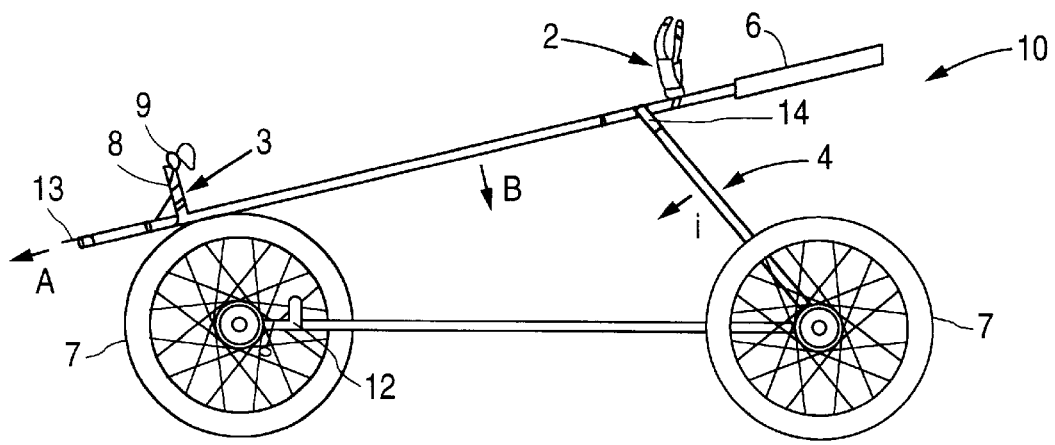
FIG. 2 is a side elevational view of the collapsible push cart of the present invention in a collapsing position.

Referring now to FIG. 2, the collapsible pushcart 10 is shown in a collapsing position. After a user has removed the golf bag 1, the user initiates the collapse of the collapsible pushcart 10 by actuating the quick release mechanisms 11. In particular, the user pulls a ring element 12 of each quick release mechanism 11 so a pin element 13 of each quick release mechanism 11 is released. As the collapsible pushcart 10 collapses, the individual members of the collapsible frame 4 move downwardly, as permitted by a pivot piece 14 and indicated by the arrows A–C, until the collapsible frame 4 is in a flat position. It should be noted that the counterweight 8 and the pivot piece 14 facilitate the movement of the collapsible frame 4 into the flat position.

Figure 3:
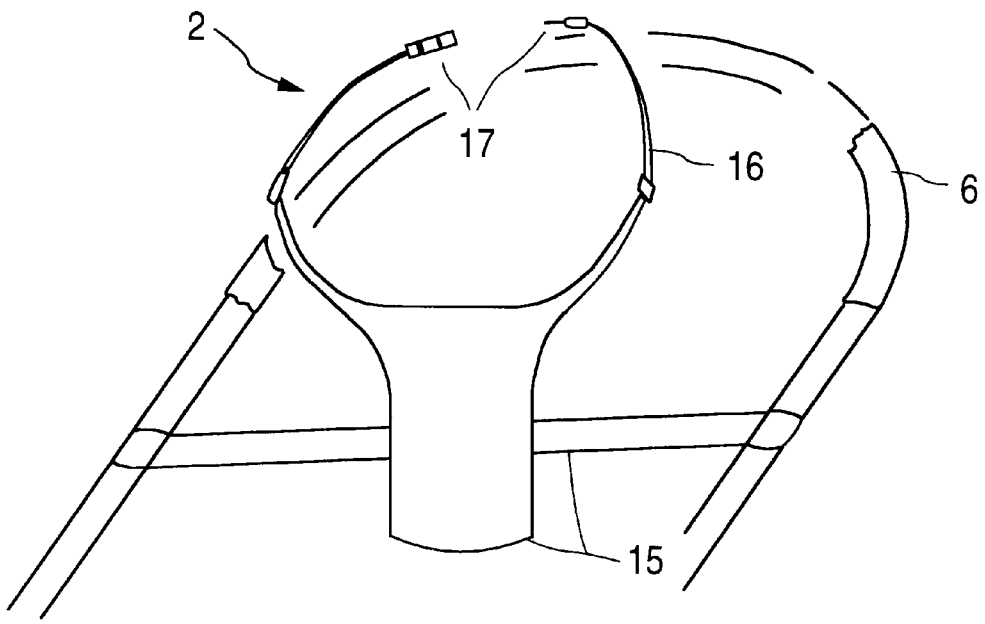
FIG. 3 is a perspective view of an upper golf bag support structure of the present invention.

Referring now to FIG. 3, the upper golf bag support structure 2 is attached to an upper portion of the collapsible frame 4 via a cross member and support 15. The upper golf bag support structure 2 includes a pair of adjustable nylon straps 16 and a push button latch 17 for joining the straps 16 together.

Figure 4:
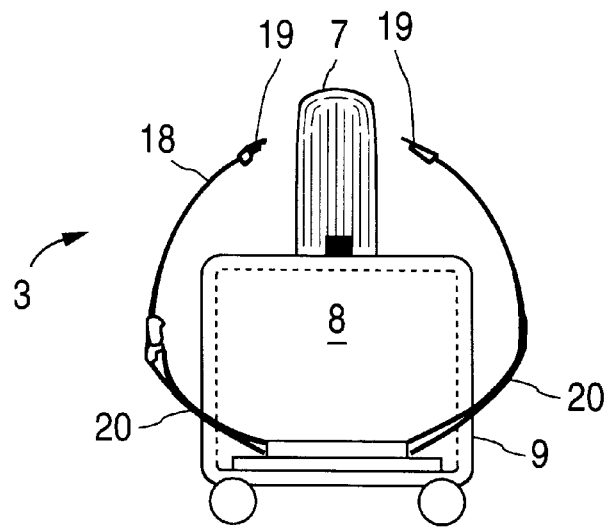
FIG. 4 is a top plan view, partially in section, of a lower support structure of the present invention.

Referring now to FIG. 4, the lower golf bag support structure 3 is attached to a lower portion of the collapsible frame 4 via a pair of support arms 20 preferably fabricated from plastic. A pair of adjustable nylon straps 18 are attached to the support arms 20 and have a push button latch 19 for joining the straps 18 together.

Figure 5:
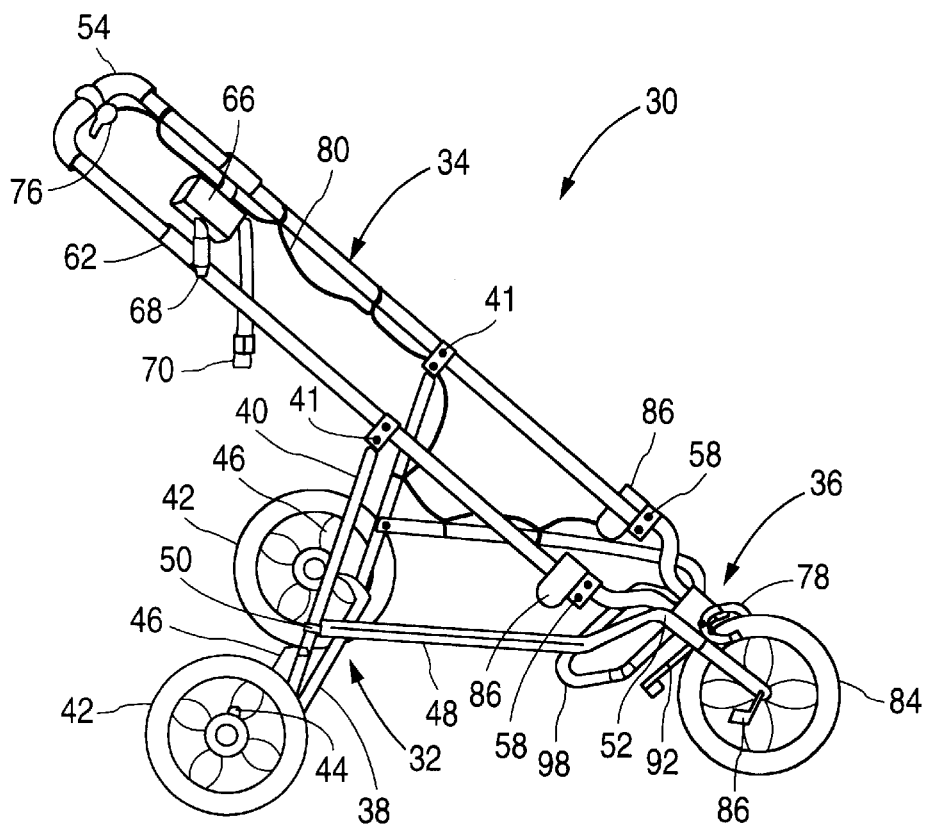
FIG. 5 is a perspective view of an alternative embodiment of the collapsible pushcart of the present invention in the deployed position.

Referring now to FIG. 5, an alternative embodiment of the collapsible pushcart of the present invention is shown. Collapsible pushcart 30 includes a base frame assembly 32 (shown as removed from collapsible pushcart 30 in FIG. 8), an upper frame assembly 34 (shown as removed from collapsible pushcart 30 in FIG. 7), and a front frame assembly 36 (shown as removed from collapsible pushcart 30 in FIGS. 9 and 10).

Figure 8:
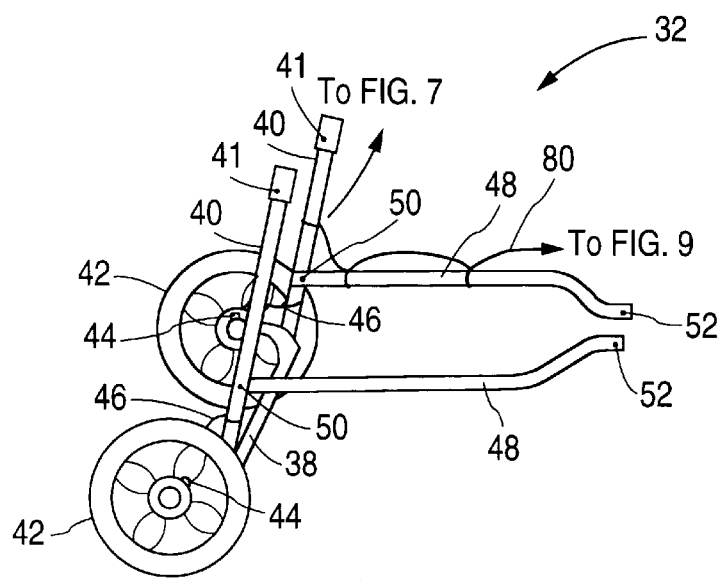
FIG. 8 is a perspective view of the base frame assembly of the collapsible pushcart shown FIG. 5.

Referring now to FIGS. 5 and 8, base frame assembly 32 includes an arcuate member 38 having a pair of legs 40 extending upwardly therefrom. Arcuate member 38 and legs 40 are preferably fabricated from a lightweight aluminum tubing. Legs 40 are pivotally connected to upper frame assembly 34 at pivot joints 41. A pair of wheels 42 are rotatably connected to arcuate member 38 via a pair of detachment mechanisms 44 that permit wheels 42 to be detached from arcuate member 38. One exemplary detachment mechanism is a removable pin that interconnects arcuate member 38 to the axle of wheel 42. Detachment mechanisms 44 are preferably connected to base frame assembly 32 via chains or straps 46 to prevent the loss of detachment mechanisms when wheels 42 are detached from arcuate member 38.

Figure 6:
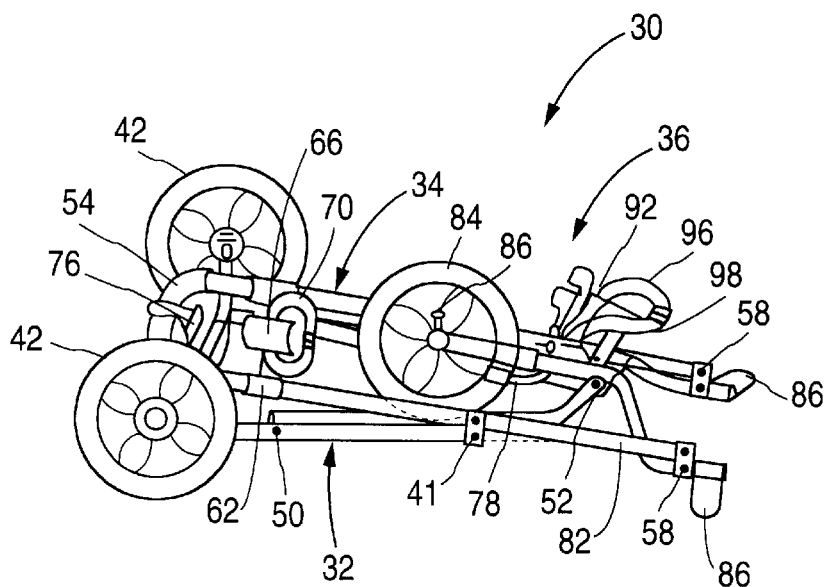
FIG. 6 is a perspective view of the collapsed position of the collapsible pushcart shown in FIG. 5.

A pair of arms 48 are pivotally connected to legs 40 at pivot joints 50. Arms 48 are also pivotally connected to front frame assembly at pivot joints 52. Arms 48 stabilize collapsible pushcart 30 when collapsible pushcart 30 is in the deployed position (FIG. 5) and facilitate the transition of collapsible pushcart 30 from the deployed position to the collapsed position (FIG. 6). Arms 48 are preferably fabricated from a lightweight aluminum tubing.

Figure 7:
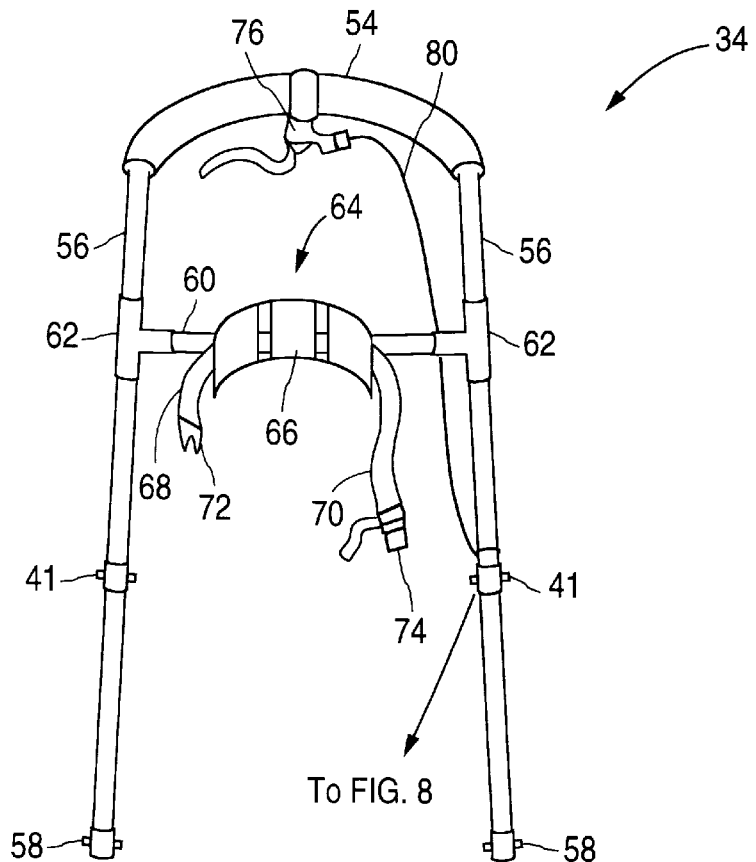
FIG. 7 is a front elevational view of the upper frame assembly of the collapsible pushcart shown FIG. 5.

Referring now to FIGS. 5 and 7, upper frame assembly 34 includes a handlebar 54 encased by a foam or rubber material to prevent a user's hands from slipping off handlebar 54 when the user is pushing pushcart 30. A pair of extended arms 56 extend away from handlebar 54 and pivotally connect to front frame assembly 36 at pivot joints 58. As noted above, extended arms 56 are also pivotally connected to legs 40 of base frame assembly 32 at pivot joints 41 located approximately at the midpoints of extended arms 56. An adjustable support bar 60 slidably engages extended arms 56 via sleeves 62. The adjustable support bar 60 is free floating and can freely move along extended arms 56 between handlebar 54 and pivotjoints 41. Handle bar 54, extended arms 56, and adjustable support bar 60 are preferably fabricated from lightweight aluminum tubing. Sleeves 62 are preferably fabricated from a durable plastic.

A securing mechanism 64 is attached to adjustable bar 60 for securing an upper portion of a golf club bag to adjustable bar 60. Securing mechanism 64 includes an arcuate member 66, preferably fabricated from a durable plastic, attached to adjustable bar 60 via bolt, screws, or the like, and a pair of straps 68 and 70 having quick release connectors 72 and 74. Arcuate member 66 is sized to engage the upper portion of a golf club bag. Strap 68 is preferably fabricated from a rubber material that allows strap 68 to resiliently stretch. Strap 70 is preferably fabricated from a nylon material and has an adjustable length.

An actuator 76 for a front wheel brake 78 is attached to handle bar 54. Actuator 76 is operably connected to front wheel brake 78 via an operation line 80 such that the user can operate the front wheel brake 78, as described in further detail below.

Figure 9:
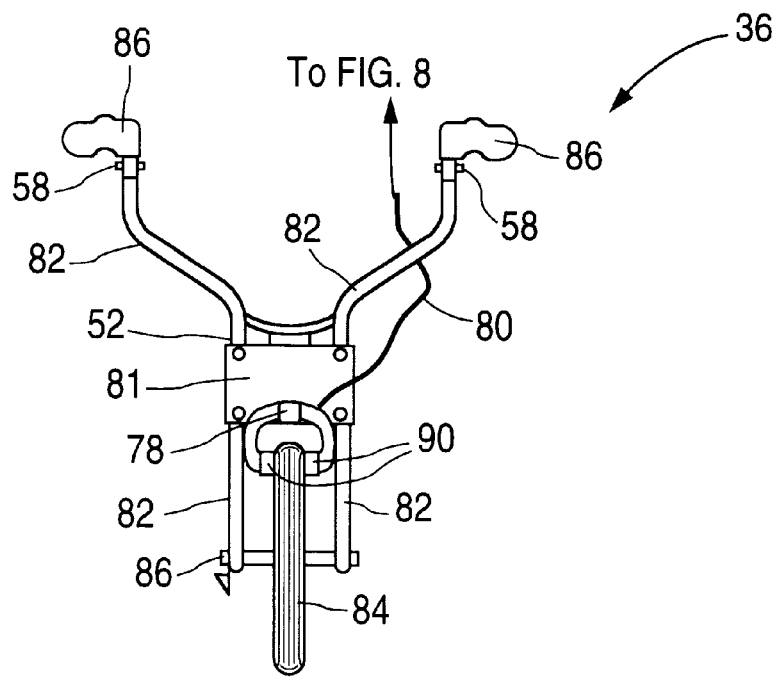
FIG. 9 is a front elevational view of the front frame assembly of the collapsible pushcart shown FIG. 5.

Referring now to FIGS. 5 and 9, front frame assembly 36 includes a plate 81 connected to a pair of shaped bars 82. Shaped bars 82 have first ends rotatably connected to a front wheel 84 via a detachment mechanism 86 that permits front wheel 84 to be detached from shaped bars 82, and second ends pivotally connected to extended arms 56 of upper frame assembly 34 at pivot joints 58. Shaped bars 82 are also pivotally connected to arms 48 of base frame assembly 32 at pivot joints 52. Detachment mechanism 86 may be a pin arrangement, as discussed above, a latch arrangement, or any other detachment mechanism known to those skilled in the art. Shaped bars 82 are preferably fabricated from a lightweight aluminum tubing and plate 81 is preferably fabricated from a durable plastic or metal.

A pair of release mechanisms 86, located adjacent pivot joints 58, also interconnect the second ends of shaped bars 82 to extended arms 56 of upper frame assembly 34. Each release mechanism 86 is rotatable connected to one of the second ends of shaped bars 82 and has a shaped portion (e.g., shaped to fit around an exterior portion of extended arm 56) the can detachable engage one of extended arms 56 in friction fit and/or resilient fit that is strengthened when the weight of a golf club bag is supported by collapsible pushcart 30. When release mechanisms 86 engage extended arms 56, collapsible pushcart 30 is maintained in a deployed position. If release mechanisms 86 are disengaged from extended arms 56, collapsible pushcart 30 is permitted to transition to a collapsed or folded position, as discussed in further detail below.

A brake 78 is mounted on plate 81 adjacent front wheel 84 such that brake pads 90 of brake 78 can selectively engage front wheel 84. As mentioned above, brake 78 is operably connected to actuator 76 via operation line 80 so the user can manipulate actuator 76 to cause the brake pads 90 to engage or disengage front wheel 84.

Figure 10:
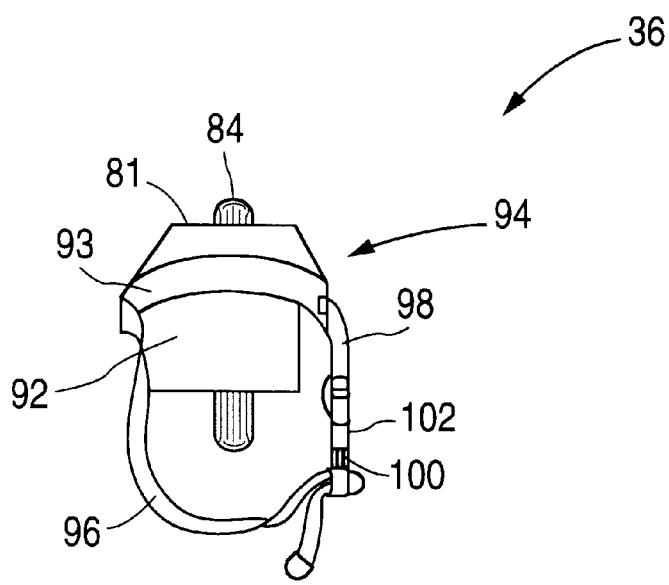
FIG. 10 is a rear elevational view of the support platform and securing mechanism of the front frame assembly shown FIG. 9.

Referring now to FIGS. 5 and 10, front frame assembly 36 also includes a support platform 92 and a securing mechanism 94 attached to the back side of plate 81. Support platform 92 supports a bottom portion of a golf club bag and securing mechanism 94 securely maintains the bottom portion of the golf club bag on support platform 92. Support platform 92 is preferably fabricated from a durable plastic or metal.

Securing mechanism 94 includes an arcuate member 93 attached to plate 81 via bolts, screws, or the like, and a pair of straps 96 and 98 having quick release connectors 100 and 102. Arcuate member 93, preferably fabricated from a durable plastic, is sized to engage a lower portion of a golf club bag. Strap 98 is preferably fabricated from a rubber material that allows strap 98 to resiliently stretch. Strap 96 is preferably fabricated from a nylon material and has an adjustable length.

Referring now to FIG. 5, when pushcart 30 is in the deployed position (as shown) a user can mount a golf club bag onto pushcart 30. Initially, the user places the bottom of the golf club bag on support platform 92 of front frame assembly 36. Afterwards, the user positions adjustable support bar 60 on extended arms 56 of upper frame assembly 34 such that an upper portion of the golf club bag will rest in arcuate member 66 of securing mechanism 64. It should be noted that the weight of the golf club bag will maintain adjustable support bar 60, and attached securing mechanism, in the position selected by the user.

Next, the user secures the upper portion of the golf bag to arcuate member 66 and adjustable support bar 60 by extending straps 68 and 70 around the upper portion of the golf club bag and engaging quick release connectors 72 and 74 with one another. Afterwards, the user can tighten the straps by adjusting nylon strap 70. It should be noted that rubber strap 68 will stretch as nylon strap 70 is adjusted. This stretching will cause engaged straps 68 and 70 to resiliently secure the upper portion of the golf club bag in a secure fit. The user can then secure the lower portion of the golf club bag on support platform 92 using a similar method of quick release connector engagement and strap adjustment.

When the user has completed mounting the golf club bag in collapsible pushcart 30, the user can push the pushcart over a golf course's terrain by pushing on handlebar 54. If the user desires to tee off or the like, the user can actuate brake 78 via actuator 76 such that the collapsible pushcart 30 will remain in a stationary position, even in inclined terrain conditions, while the user tees off. Afterwards, the user can resume the pushcart's motion by releasing brake 78, via manipulation of actuator 76, and pushing on handlebar 54.

Referring now to FIG. 6, the user can initiate the collapse of collapsible pushcart 30 by disengaging release mechanisms 86 from extended arms 56 of upper frame assembly 34. Afterwards, the user pivots front frame assembly 36 about pivot joints 52, i.e., towards rear wheels 42 and underneath base frame 32, until the front frame assembly 36 is positioned within base frame assembly 32. This movement causes extended arms 56 of upper frame assembly 34 to pivot in a clockwise motion around pivot joints 58 and in counterclockwise motion around pivot joints 41 which, in turn, causes legs 40 and arms 48 of base member 32 to move downward until handle bar 54 of upper frame assembly 34 rests upon arcuate member 38 of base frame assemble 32. Afterwards, the user may detach rear wheels 42 from base frame assembly 32 and front wheel 84 from front frame assembly 36, and store collapsible pushcart 30 in the trunk of a car, a closet, or the like.

While the present invention has been described with reference to preferred embodiments, it is apparent that various changes may be made without departing from the spirit and scope of the invention, as defined by the appended claims. For example, connecting the front and rear wheels to the collapsible push cart through a mechanism that permits the wheels to be folded downwardly into a horizontal position when the pushcart is lying flat in the collapsed position is considered within the scope of the claims.

What is claimed is:

1. A collapsible pushcart for supporting a golf club bag, comprising:

a base frame assembly having a pair of rear wheels rotatably connected thereto;

an upper frame assembly pivotally connected to the base frame assembly, the upper frame assembly having an adjustable support bar slidably attached thereto such that a user can position the adjustable support bar to support an upper portion of a golf club bag thereon, and a first securing mechanism attached to the adjustable support bar for securing the upper portion of the golf club bag to the adjustable support bar;

a front frame assembly pivotally connected to the base frame assembly and the upper frame assembly, the front frame assembly having a front wheel rotatably connected thereto, a support platform attached thereto for supporting a lower portion of the golf club bag, and a second securing mechanism attached thereto for securing the lower portion of the golf club bag to the support platform the support platform positioned to the rear of the front wheel and beneath the base frame assembly; and a release mechanism interconnecting the upper frame assembly and the front frame assembly such that the collapsible pushcart is maintained in a deployed position when the release mechanism is engaged and transitions to a collapsed position when the release mechanism is disengaged;

the front frame assembly extending to a position external of the base frame assembly and the upper frame assembly extending a position above the base frame assembly when the collapsible pushcart is in the deployed position;

the front frame assembly pivoting to a position internal to the base frame assembly and the upper frame assembly pivoting to a position adjacent the base frame assembly when the pushcart is in the collapsed position.

2. The collapsible pushcart of claim 1, wherein the rear wheels are detachably connected to the base frame assembly.

3. The collapsible pushcart of claim 1, wherein the front wheel is detachably connected to the front frame assembly.

4. The collapsible pushcart of claim 1, wherein the first securing mechanism is a resilient strap arrangement that includes:

an arcuate member attached to the adjustable support bar, the arcuate member shaped to receive the upper portion of the golf club bag;

a substantially rubber strap having a first end attached to the arcuate member and a second end attached to a male connector; and a substantially nylon strap having a first end attached to the arcuate member and a second end attached to a female connector.

5. The collapsible pushcart of claim 1, wherein the second securing mechanism is a resilient strap arrangement that includes:

an arcuate member attached to the support platform, the arcuate member shaped to receive the lower portion of the golf club bag;

a substantially rubber strap having a first end attached to the arcuate member and a second end attached to a male connector; and a substantially nylon strap having a first end attached to the arcuate member and a second end attached to a female connector.

6. The collapsible push cart of claim 1, further comprising:

a brake mounted on the front frame assembly adjacent the front wheel such that the brake can selectively engage and disengage the front wheel; and a brake actuator operably connected to the brake and mounted on the upper frame, the brake actuator causing the brake to selectively engage and disengage the front wheel in response to the user manipulating the brake actuator.

7. The collapsible pushcart of claim 1, wherein the base frame assembly, the upper frame assembly, and the front frame assembly are positioned substantially parallel to one another when the collapsible pushcart is in the collapsed position.

8. The collapsible pushcart of claim 1, wherein the adjustable support bar can be positioned on the upper frame assembly by the user to support golf club bags of varying lengths.

* * * * *